United States Patent [19]

Ellefson

[11] Patent Number: 4,789,370

[45] Date of Patent: Dec. 6, 1988

[54] APPARATUS FOR INTERLOCKING STRUCTURAL ELEMENTS OF TOY DISKS

[75] Inventor: Jerome K. Ellefson, Lakewood, Colo.

[73] Assignee: Go Images, Inc., Englewood, Colo.

[21] Appl. No.: 13,287

[22] Filed: Feb. 11, 1987

[51] Int. Cl.$^4$ .............................................. A63H 33/00
[52] U.S. Cl. .................................. 446/113; 446/114; 446/116
[58] Field of Search ............... 446/113, 114, 116, 108, 446/120, 125

[56] References Cited

U.S. PATENT DOCUMENTS

| | | | |
|---|---|---|---|
| 1,706,388 | 3/1929 | Ashkenas | 446/114 |
| 2,633,662 | 4/1953 | Nelson | 446/114 |
| 2,984,935 | 5/1961 | Beck | 446/114 |
| 3,177,611 | 4/1965 | Beck | 446/114 |
| 3,479,763 | 11/1969 | Fischer | 446/127 |
| 3,564,758 | 2/1971 | Willis | 446/114 |
| 3,570,169 | 3/1971 | Jacob | 446/114 |
| 3,827,177 | 8/1974 | Wengel | 446/116 |
| 3,891,335 | 6/1975 | Feil | 446/114 |
| 3,991,511 | 11/1976 | McAllister et al. | 446/114 |
| 4,147,007 | 4/1979 | Eppich | 446/114 |
| 4,569,665 | 2/1986 | Belton | 446/114 |

FOREIGN PATENT DOCUMENTS

| | | | |
|---|---|---|---|
| 132550 | 5/1949 | Australia | 446/114 |
| 2301981 | 7/1974 | Fed. Rep. of Germany | 446/114 |
| 3246817 | 6/1984 | Fed. Rep. of Germany | 446/127 |
| 1243060 | 8/1960 | France | 446/114 |
| 1229291 | 4/1971 | United Kingdom | 446/114 |

Primary Examiner—Robert A. Hafer
Assistant Examiner—Charles H. Harris
Attorney, Agent, or Firm—Dorr, Carson, Sloan & Peterson

[57] ABSTRACT

A method of and apparatus for maintaining the interlocked relationship of at least two relatively thin flat structural members positioned at right angles to each other. Bosses are provided on a notch on each element together with a spring means to receive and hold the other element in an interlocked state. The spring means comprises the material of a member intermediate a boss and a void formed in the material adjacent the boss.

12 Claims, 1 Drawing Sheet

U.S. Patent  Dec. 6, 1988  4,789,370
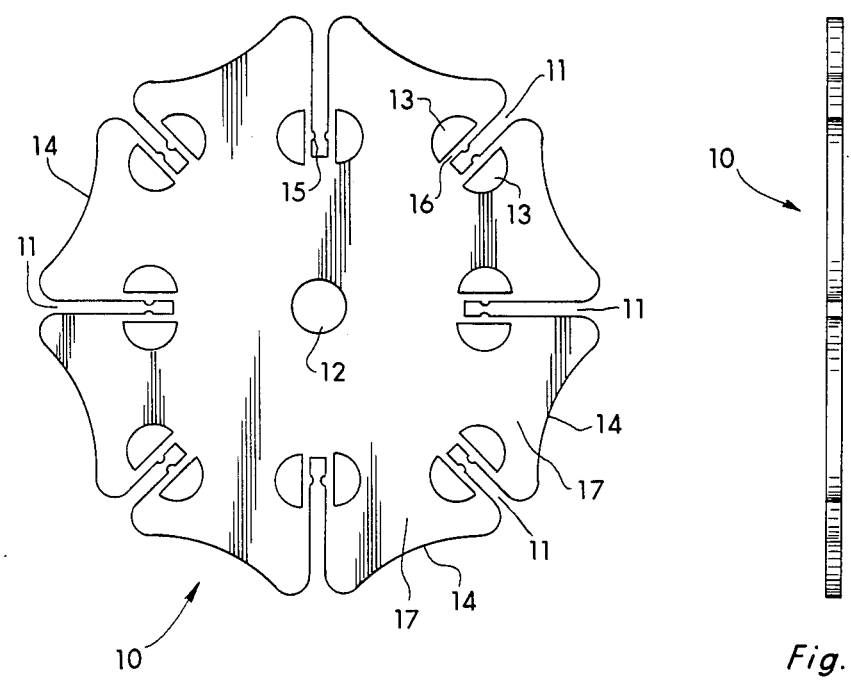
Fig. 1
Fig. 2
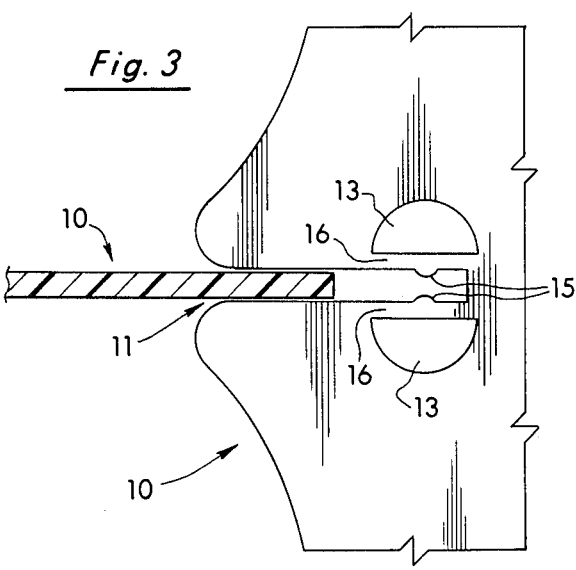
Fig. 3

APPARATUS FOR INTERLOCKING STRUCTURAL ELEMENTS OF TOY DISKS

FIELD OF THE INVENTION

This invention relates to apparatus comprising and a method of interlocking structural elements such as plastic disks for children's toys.

BACKGROUND OF THE INVENTION

It is known to create different structures by assembling and interlocking flat pieces of plastic or the like. The flat pieces are provided with peripheral notches which enable the pieces to be fitted together and interlocked at right angles to each other. An arrangement of this type is shown in U.S. Pat. No. 2,984,935. This U.S. Patent discloses a plurality of disk-like elements 10 having a plurality of peripheral notches 12 and 13. A plurality of elements 10 can be connected together by positioning each pair of such elements at right angles to each other and by then inserting the notch of one element into a notch of another element.

It is a problem to maintain a facile, consistent, and reliable interlocking of these elements 10 of U.S. Pat. No. 2,984,935. The width of the peripheral notches 12 and 13 and the thickness of the material comprising each element 10 must be such that the elements can be easily interlocked and subsequently disassembled. However, once interlocked, it is desirable that the elements remain interlocked until intentionally disassembled by the user.

It heretofore has been difficult to meet the above requirements especially in view of the abusive use given to such toys by children under the age of ten. Care must be taken in the design and fabrication of the elements so that their interlocking is facile and reliable. For example, if an element is too thick, it becomes difficult for a user, such as a child, to interlock the elements. If an element is too thin, the interlocking is easy; but the parts may not reliably remain interlocked and may accidently separate.

It can thus be seen that facile and reliable interlocking can be achieved only if the parts are designed and fabricated to precise dimensions and tolerances. However, even if the desired dimensions and tolerances are acheived initially, the subsequent wear and tear on the parts as they are used changes the original design dimensions. As a result, parts which properly and reliably interlock when new, may become loose and may accidently disengage from each other as they wear.

The above discussed factors regarding the proper fit and dimensioning of parts has several associated disadvantages. First, precision in design is required so that the parts have the correct dimensions. Second, if the parts are made of plastic, close tolerances in the making of the required molds is required. Also required is the critical processing of the parts as they are fabricated. All of these factors increase considerably the cost of design and fabrication of parts having the correct dimensions.

Thus, it can be seen that it is a problem inexpensively to design and fabricate parts that have the desired interlocking characteristics.

SUMMARY OF THE INVENTION

The present invention solves the problems that heretofore have been associated with the design, fabrication, and use of interlocking parts of the type of toy shown in U.S. Pat. No. 2,984,935. In accordance with the present invention, there is provided on an interlocking element a boss on the side of a peripheral notch comparable to the notches 12 and 13 of the above-identified U.S. Patent. Also, a hole, opening, or void is formed in the element close to each boss. This results in a narrow deformable spring formed by the strip of material intermediate the boss and the void.

The boss and the deformable strip provide a spring function that permits easy interlocking of the structural elements and firmly holds them together once they are interlocked. Further, the spring action of the flexible strip and the pressure on the inserted member provided by the boss and the spring holds the interlocked parts together even after considerable use and wear on the parts.

The boss and the flexible strip comprising the spring of a notch are further advantageous in that they make far less critical the dimensions associated with the design of the parts as well as with the design of the molds and dies that fabricate the parts. This, in turn, reduces the cost of producing the parts.

In summary, the present invention provides interlocked elements that have more reliable interlocking characteristics, elements which contain these characteristics throughout their useful life and elements which are also less expensive to produce.

BRIEF DESCRIPTION OF THE DRAWING

The advantages of the invention may be better understood from the reading of the following description thereof taken in conjunction with the drawing in which:

FIG. 1 is a plan view of an element embodying one possible exemplary embodiment of the invention;

FIG. 2 is a side view of the element of FIG. 1; and

FIG. 3 is an enlarged view of a notch 11, boss 15, void 13, and flex strip 16 showing two elements 10 partially interlocked with each other.

DETAILED DESCRIPTION

FIG. 1 discloses a building element 10 as comprising a flat disk structure having a hole or center 12 and a plurality of peripheral notches 11 each of which extends radially inward from the outer periphery of the element 10 towards the center 12. An opening or void 13 is shown on each side of each notch 11. The relationship between each void 13 and its associated notch 11 is such that a resultant thin flexible strip 16 is provided by the remaining material intermediate each void and its notch 11. Each notch 11 has a boss 15 on the flexible strip 16 comprising the material intermediate the notch 11 and each of its voids 13.

Element 10 further comprises a plurality of petal-like segments 17 each having an outer periphery 14. Each segment 17 is intermediate adjacent ones of the notches 11.

FIG. 2 discloses a cross-sectional view of the element 10 of FIG. 1.

FIG. 3 illustrates an enlarged view of a notch 11 voids 13 positioned on each side of the inner end of notch 11 and a boss 15 on each side of notch 11. A flexible strip 16 having as a part thereof boss 15 is thus formed on each side of the inner end of the notch 11. Strip 16 comprises the material of element 10 that is intermediate a void 13 and a notch 11.

FIG. 3 also shows a second member 10 positioned on the left side of and right angles to the right most element 10 whose structural details 13, 15, and 16 are shown. The left most element 10 is shown partially inserted into the notch 11 of the right most element 10. It can be seen that when the left most element 10 is inserted further to the right on FIG. 3, that it will engage the bosses 15. When the left most element 10 is inserted further to the right, it will bear against the bosses 15 and deflect the thin strips 16 inwardly towards the voids 13. A spring function is provided by each strip 16. Each spring 16 and its boss 15 exerts sufficient pressure against the left most element 10 to hold the two elements 10 together once they are interlocked as the left most element 10 is fully inserted into the notch 11 of the right most element 10. When the two elements 10 are interlocked in this manner, the spring function provided by strips 16 and bosses 15 firmly holds the left most element 10 in the interlocked position. Also, at this time, bosses 15 and flexible strips 16 on the left most element 10 also hold the right most element 10 firmly in its interlocked state.

Thus, can be seen that the present invention provides an improved method of and apparatus for interlocking two relatively thin flat structural elements. The reliable interlocking of these elements does not depend primarily on the precise machining and dimensioning of the elements themselves. Instead this reliable interlocking is achieved by the spring function provided by the flexible strips 16 and their bosses 15. In contrast to the prior art, the wear and tear on the elements 10 and the change in their dimensions as they are used does not reduce the reliability of the holding action of two interlocked elements 10. The reason for this is that the reliable interlocking is dependent not on the dimensions or thickness of the elements 10 but, instead, is dependent on the spring-like action provided by strip 16 and bosses 15. This lessened reliance on the criticality of the thickness of the elements 10 permits less critical tolerances and, hence, a lower cost to be achieved in the manufacturing of the elements 10.

Element 10 has been shown in the present specification generally as being circular and having a disk configuration. This is not a necessity nor a limitation. If desired, the invention may be used with structural elements of any configuration such as triangular, rectangular, or any configuration in which the action provided by a boss, a void and a thin flexible strip functioning as a spring may advantageously be used.

While the preferred embodiment has been set forth with a degree of particularity, it is to be understood that changes and modifications could be made to the construction thereof which would still fall within the teachings of the claimed invention as set forth in the following claims.

I claim:

1. A structural element comprising a substantially flat and thin flexible member having an outer periphery and an elongated notch extending from said periphery inwardly towards a center portion of said member, said element further comprising:
    a boss positioned on a side of said notch,
    a void formed within said element and spaced apart from and adjacent said boss, said void being positioned within said element so that an imaginary straight line substantially perpendicular to said side of said notch passes through a center of said void and a center of said boss, said void being further positioned within said element so that said void is entirely surrounded by the material of which said element is comprised, and
    an elongated thin flexible spring member comprising the portion of said element intermediate said void and said boss, said spring member being adapted to press said boss against the surface of another said structural element inserted into said notch while engaging said boss.

2. A structural element comprising a substantially flat and thin flexible member having an outer periphery and an elongated notch extending from said periphery inwardly towards a center portion of said member, said element further comprising:
    a boss positioned on a side of said notch,
    a semicircular void formed within said element and spaced apart from and adjacent said boss, said void being positioned within said element so that an imaginary straight line substantially perpendicular to said side of said notch passes through a center of said void and a center of said boss, and
    an elongated thin flexible spring member comprising a strip of material having substantially parallel sides with one of said sides comprising said side of said notch on which said boss is positioned and with the other side of said strip comprising a chordal segment of said semicircular void, said spring member being adapted to press said boss against the surface of another said structural element inserted into said notch while engaging said boss.

3. A structural element comprising a substantially flat and thin flexible member having an outer periphery and an elongated notch extending from said periphery inwardly towards a center portion of said member, said element further comprising:
    a boss positioned on a side of said notch,
    a semicircular void formed within said element and spaced apart from and adjacent said boss, said void being positioned within said element so that a center of said boss and a center of said void define a straight line perpendicular to said side of said notch, said void being further positioned within said element so that said void is entirely surrounded by the material of which said element is comprised, and
    an elongated thin flexible spring member comprising the portion of said element intermediate a chordal segment of said semicircular void and said boss, said spring member being adapted to press said boss against the surface of another said structural element inserted into said notch while engaging said boss.

4. The element of claim 1 wherein said element is of a circular configuration.

5. A structural element comprising a substantially thin and flat flexible disk having a center, an outer periphery and an elongated notch extending radially from said periphery and inwardly towards said center, said notch having a width approximately equal to the thickness of said element so that another said element can be inserted into said notch, said element further comprising:
    a boss positioned on a side of said notch,
    a semicircular void formed within said element and spaced apart from and adjacent said boss, said void having at least one chordal perimeter segment, said void being positioned within said element so that a center of said boss and a center of said void define a straight line perpendicular to said side of said notch, and an elongated thin flexible spring comprising a strip of said material intermediate said side of said notch and said chordal segment of said void, and said spring being adapted to press said boss against the surface of another said structural element inserted into said notch while engaging said boss.

6. A building element comprising a substantially thin flat flexible disk member having a center, an outer periphery and a plurality of elongated notches extending radially from said periphery inwardly towards said center, each of said notches having a width approximately equal to the thickness of said element so that another said element can be inserted into any one of said notches, said element further comprising:

a boss positioned on each side of said notches, a plurality of semicircular voids formed within said element so that each of said voids is adjacent an associated one of said bosses, each of said voids having a perimeter defined by an arcuate segment and a chordal segment, said chordal segment of a void being substantially parallel to the side of a notch on which the boss associated with said last named void is positioned, each of said voids being positioned within said element so that a center of an associated boss and a center of said last named void define a straight line perpendicular to a side of said notch on which said associated boss is positioned, each of said voids being further positioned within said element so that each said void is entirely surrounded by the material of which said element is comprised, and a plurality of elongated thin flexible springs with each of said springs comprising a thin elongated strip portion of said element unique to and positioned intermediate an associated one of said voids and an associated boss, each of said springs having substantially parallel sides with one of said sides being said chordal portion of an associated void and with the other side of said spring being a side of said notch associated with said last named void, said spring being adapted to press said associated boss against the surface of another said building element inserted into the notch of which said last named boss is a part while said other building element engages said last named boss.

7. The element of claim 6 wherein said element is radially divided into a plurality of segments on its outer periphery with each segment being intermediate a different pair of said notches and wherein the outer periphery of each segment being of an inwardly concave configuration with respect to said center.

8. A building element for toy structures comprising a substantially thin and flat flexible plastic disk member having a center, an outer periphery and a plurality of elongated notches angularly spaced apart from each other with each of said notches extending radially from said periphery inwardly towards said center, each of said notches having a width approximately equal to the thickness of said element so that another said element can be inserted into any one of said notches, said element further comprising:

a plurality of bosses with there being at least one boss positioned on each side of each of said notches, and a plurality of semicircular voids each of which is individual to and associated with a different one of said bosses, each of said voids comprising a half circle with the diameter of said half circle being substantially parallel to the side of a notch on which the boss associated with said associated void is positioned, said void being positioned within said element so that an imaginary straight line substantially perpendicular to said side of said notch passes through a center of said void and a center of said boss, each of said voids being positioned adjacent to and spaced apart from its associated boss so that the portion of said element intermediate a boss and the diameter of its associated void forms an elongated thin flexible spring for pressing said last named boss against the surface of another said element inserted into the notch of which said last named boss is a part while said other element engages said last named boss.

9. The element of claim 8 wherein said element is radially divided into a plurality of petal segments on its outer periphery with each segment being intermediate a different pair of said notches and wherein the outer periphery of each segment is of an inwardly concave configuration with respect to said center.

10. A method for interlocking together two substantially flat and thin and flexible disk members of essentially the same thickness, said method comprising the steps of:

forming an elongated notch in at least a first one of said disk members with said notch being of a width approximately equal to the thickness of said members and with said notch extending inwardly from an outer periphery of said member towards a center portion of said member, forming a boss on a side of said notch, forming in said first member a void spaced apart from said boss so that the portion of said member intermediate said boss and said void forms an elongated thin flexible spring, said void being positioned within said element so that an imaginary straight line substantially perpendicular to said side of said notch passes through a center of said void and a center of said boss, said void comprising a half circle with the diameter of said half circle being substantially parallel to the side of said notch on which said boss is positioned, said spring having substantially parallel sides with one of said sides being said diameter and with the other of said sides of said spring being said side of said notch on which said boss is positioned, and inserting said other member into said notch to engage said boss and deflect said boss and said flexible spring towards said void, the pressure exerted on said other member by said boss and said flexible spring being effective to maintain said members in an interlocked state.

11. The method of claim 10 wherein said other member has a boss and a notch similar to that of said first member and wherein the notch portion of said first member is inserted into the notch of said other member until a portion of each member deflects the boss and spring of the other member.

12. The method of claim 10 wherein said element comprises a plastic material and is radially divided into a plurality of segments on its outer periphery with each segment being intermediate a different pair of said notches and wherein the outer periphery of each segment is of an inwardly concave configuration.

* * * * *